Patented Feb. 10, 1948

2,435,887

UNITED STATES PATENT OFFICE 2,435,887

STABILIZATION OF CHLORINATED ETHYLBENZENE BY BASIC ANION EXCHANGE AGENTS

Herbert G. Hornbacher and William C. Bauman, Midland, Mich., assignors to The Dow Chemical Company, Midland, Mich., a corporation of Delaware No Drawing. Application March 1, 1946, Serial No. 651,430

15 Claims. (Cl. 202—57)

This invention concerns the stabilization at temperatures below 180° C. of chlorinated ethylbenzenes having the general formula:

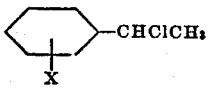

wherein X represents hydrogen or a chlorine substituent. It is particularly concerned with stabilization of such compound, especially alpha-chloroethyl-chlorobenzene, during purification of the same by distillation.

The compounds having the above general formula are intermediates from which styrene or nuclear chlorinated styrene may be produced by removal of hydrogen chloride from the side chain of the molecule in accordance with known methods. As formed, e. g. by the side-chain chlorination of ethylbenzene or ethyl-chlorobenzene, such intermediate compound is obtained in a crude form containing impurities such as unreacted ethylbenzene, or ethyl-chlorobenzene, or polychlorinated ethylbenzene of higher chlorine content than is desired, etc. When the intermediate chlorinated ethylbenzene compound is to be used for the production of the corresponding vinyl aromatic compound, i. e. styrene or monochlorostyrene, it is important that it first be purified. Otherwise the vinyl aromatic compound is obtained in a form containing impurities, such as those just mentioned, certain of which boil at close to the same temperature as the vinyl aromatic product.

However, difficulties are encountered when attempt is made to purify by fractional distillation an alpha-chlorinated ethylbenzene compound having the aforementioned general formula. Hydrogen chloride is split from a considerable portion of the material during the distillation, even when operating under vacuum, and the hydrogen chloride catalyzes polymerization of the vinyl aromatic compound which is formed by the decomposition reaction. As a result, recovery of the alpha-chloroethylbenzene compound in purified form is undesirably low and polymer accumulates within the still and distillation column, interfering with operation of the same and eventually causing plugging. Also, precautions are required to avoid corrosion of metal equipment by the hydrogen chloride evolved.

We have discovered that the small amount of hydrogen chloride formed in the early stages of the distillation has an effect of catalyzing the decomposition reaction and that by preventing accumulation of an appreciable concentration of hydrogen chloride in the distilling mixture the alpha-chloroethylbenzene compound may satisfactorily be distilled under vacuum without decomposition or polymerization occurring to more than a minor extent. The purified alpha-chloroethylbenzene compound may thereby be recovered in excellent yield. We have also discovered that the basic form of anion exchange agents, such as are commonly used for the removal of anions from water, are highly effective in stabilizing the aforementioned alpha-chloroethylbenzene compounds against decomposition at temperatures up to 180° C. and that by heating the alpha-chloroethylbenzene compound together with an anion exchange agent under vacuum to a distilling temperature below 180° C., the distillation may be accomplished without occurrence of appreciable decomposition of the material subjected to the distillation. The anion exchange agents apparently react with the very small amount of hydrogen chloride which is formed by decomposition of the alpha-chloroethylbenzene compound at the distilling temperature and also with any hydrogen chloride initially present in free form, and thereby prevent the presence of more than a trace, e. g. 0.5 per cent or less, of free hydrogen chloride in the mixture undergoing distillation. In the absence of an appreciable concentration of hydrogen chloride, decomposition of the alpha-chloroethylbenzene compound and polymerization of the vinyl aromatic decomposition product occur sluggishly and to an inconsequential extent.

We are aware that polychlorinated aliphatic hydrocarbons such as carbon tetrachloride, or ethylene chloride, etc., have heretofore been stabilized against decomposition at elevated temperature by admixing alkaline substances, e. g., sodium bicarbonate, lime, aniline, or triethanolamine, etc., therewith. However, many, if not all, of the alkaline materials thus previously employed are unsatisfactory when used for the stabilization, during distillation, of the alpha-chloroethylebenzene compounds with which this invention is concerned. For instance, lime and sodium bicarbonate, when tested, failed to stabilize alpha-chloroethylchlorobenzene satisfactorily. Triethanolamine, when similarly tested, reacted to form a solid hydrochloride which accumulated in, and caused plugging of, the distilling column. Also, anion exchange agents, although highly satisfactory for the stabilization at elevated temperatures of the alpha-chloroethylbenzene compounds of this invention, have proven unsatisfactory as agents for stabilizing related compounds such as alpha-chloroethyl-dimethyl-benzene, alpha - chloroethyldichlorobenzene, etc., during distillation.

A variety of anion exchange agents, suitable for use in the process of this invention, are known to the art. In general, such agents are water-insoluble solids containing basic nitrogen groups or radicals, e. g. amino, alkylamino, or dialkylamino radicals, etc. The anion exchange agents are not necessarily basic in the sense of rendering water in contact therewith of a pH value higher than 7. In fact they usually are practically neutral, or only slightly basic, and in some instances even slightly acidic when tested in such a manner. However, the basic radicals thereof react readily with acids such as hydrochloric, nitric, or sulphuric acid, to form water-insoluble salts of the exchange agents. The anion exchange agents are in a basic form when such radicals thereof are free, i. e. not combined as a salt of an acid. Examples of anion exchange agents which may be employed are resins formed by the condensation of formaldehyde with amines or polyamines, e. g. aniline, phenylene diamine, or ethylene diamine; and the resinous condensation products of a phenol, formaldehyde and an aliphatic amine, aliphatic polyamine, or a polyalkylenepolyamine; etc.

In purifying crude alpha-chloroethylbenzene, or crude alpha-chloroethylchlorobenzene, by the present method, the material is subjected to fractional distillation under vacuum at distilling temperatures below 180° C. while in contact with a granular basic form of an anion exchange agent. The distillation may be carried out batchwise, or in continuous manner.

When carrying out the distillation in batch manner, the anion exchange agent is effective in curtailing decomposition of the alpha-haloethylbenzene compound, regardless of whether it is added to the material in the still pot or is employed, e. g. as a packing material, within the still column. It is most effective, of course, when distributed throughout a major portion of the zone within which the alpha-chloroethylbenzene compound is heated during distillation; hence, it is preferably both added to the charge in the still pot and employed as packing within the distilling column. When carrying out the distillation in continuous manner, the column is preferably packed in a way such as to have anion exchange agent distributed throughout a major portion of its length. The anion exchange agent may be used alone, or in conjunction with other column packing materials such as Raschig rings, Berl saddles, or glass beads, etc. When the exchange agent is properly distributed throughout the distillation zone, very little, if any, of the alpha-chloroethylbenzene compound is decomposed and only a minor amount of the exchange agent, relative to the weight of material distilled, is consumed by reaction with hydrogen chloride. Accordingly, distribution of the anion exchange agent within the heated distillation zone is of greater importance than the amount of anion exchange agent employed. When properly distributed within said zone, only a small amount of anion exchange agent, e. g. an amount corresponding to from 0.1 to 5 per cent of the weight of the alpha-chloroethylbenzene compound subjected to distillation, is sufficient for the purpose of the invention. Said agent may, of course, be used in as large a proportion as desired.

Except for the employment of an anion exchange agent in contact with the material under treatment the fractional distillation is carried out in conventional manner with heating of the distillation mixture, cooling of the overhead products to effect condensation, and return of a portion of the condensate to an upper section of the distilling column as reflux material.

When, after prolonged or repeated use in the process, the anion exchange agent becomes ineffectual and excessive decomposition of material undergoing distillation occurs, the agent may readily be reconditioned so as to be suitable for further use as a stabilizing agent. Such failure of the anion exchange agent is usually due to gradual absorption of hydrogen chloride, or other acids, with conversion of the exchange agent to a salt, e. g. the hydrochloride, thereof. The used exchange agent is readily regenerated by freeing the same of any oily occlusions, e. g. by evaporation or extraction of the latter, by treating the exchange agent with an aqueous solution of an alkali such as ammonia, sodium or potassium hydroxide, or a corresponding carbonate or bicarbonate, etc., and thereafter washing the agent with water and drying it. When the agent has been used as packing within a still column, such regeneration steps may, if desired, be accomplished without removal of the anion exchange agent from the column. For instance, an aqueous alkali solution may be sprayed, trickled, or otherwise passed through the column, after which the packing may be similarly washed free of excess alkali and alkali salts with water and be dried. The regenerated resin is entirely suitable for use as a stabilizing agent in distilling further amounts of the alpha-chloroethylbenzene compound.

When, for any purpose, the aforementioned alpha-chloroethylbenzene compounds are to be heated to temperatures not exceeding their atmospheric boiling points, they may advantageously be stabilized against thermal decomposition by admixing a basic form of an anion exchange agent therewith. A basic form of an anion exchange agent may also advantageously be admixed with such alpha-chloroethylbenzene compound so as to stabilize the latter against decomposition during storage or shipment at ordinary temperature, e. g. room temperature. When the stabilizing action is no longer required, the alpha-chloroethylbenzene compound is readily separated from the anion exchange agent by filtration or decantation.

The following examples illustrate one way in which the principle of the invention has been applied, but are not to be construed as limiting the invention.

*Example 1*

Two experiments on the fractional distillation of crude alpha-chloroethylchlorobenzene were carried out for the purpose of determining the effectiveness of a basic form of an anion exchange agent in preventing decomposition of the material being distilled. The crude alpha-chloroethylchlorobenzene was prepared by a side-chain chlorination of ethylchlorobenzene. It contained, together with the several isomeric forms of alpha-chloroethylchlorobenzene, the compounds ortho-chloroethylbenzene, ethyl-dichlorobenzene and organic impurities of unknown identity. In the first experiment, the crude alpha-chloroethylchlorobenzene was fractionally distilled under vacuum using a distillation column packed with glass rings and equivalent to approximately 16 theoretical plates. No anion exchange agent was present. The distillation was started at 5 millimeters absolute pressure and was continued at said pressure until a fraction of ortho-ethylchlorobenzene had been collected. Only slight decomposition with formation of hydrogen chloride was observed during collection of said fraction of distillate. The rate of decomposition then accelerated with evolution of hydrogen chloride at a rate such that the desired vacuum, i. e. 5 millimeters absolute pressure, could no longer be maintained. Accordingly, the distillation was discontinued. The distillate and residue had a combined weight corresponding to only 84 per cent of the weight of material subjected to the distillation, i. e. the loss in weight due to evolution of hydrogen chloride was approximately 16 per cent. The residue was found to contain considerable polymeric material. The other experiment was carried out similarly, except that 50 grams of an anion exchange agent consisting of a resinous condensation product of phenol, formaldehyde, ethylene diamine and polyethylenepolyamines, was admixed with a charge of 1968 grams of the crude alpha-chloroethylchlorobenzene and that 5 grams of the same anion exchange agent was distributed throughout the mass of glass rings employed as packing in the distilling column. The crude alpha-chloroethylchlorobenzene contained 1.39 per cent by weight of free hydrogen chloride. The fractional distillation was carried out at 3 millimeters absolute pressure using a reflux ratio of 10 i. e., 10 parts by volume of condensate was returned continuously as reflux material for each part withdrawn as distillate. The following table names the principal component of each fraction of distillate and gives the range of distilling temperatures at 3 millimeters absolute pressure over which it was collected. It also gives the weight of each fraction; its density at 25° C. with respect to water at 4° C.; its index of refraction, $n_D^{25}$; and the per cent by weight of free hydrogen chloride therein.

Table

| No. | Distillate Fractions | | | | | |
| --- | --- | --- | --- | --- | --- | --- |
| | Principal Component | Wt., Grams | Dist'n Temp., ° C. at 3 mm. | $d_4^{25}$ | $n_D^{25}$ | Per cent HCl |
| 1 | Ethyl-chlorobenzene | 600 | 35-39 | 1.3912 | 1.5176 | 0.79 |
| 2 | Intermediates | 38 | 39-64 | not measured | | |
| 3 | Ethyl-dichlorobenzene | 277 | 64-66.5 | 1.2075 | 1.5427 | 0.39 |
| 4 | alpha-Chloroethyl-chlorobenzene | 128 | 66.5-70 | 1.2051 | 1.5428 | 0.31 |
| 5 | alpha-Chloroethyl-chlorobenzene | 403 | 70-72 | 1.2038 | 1.5428 | 1.09 |
| 6 | alpha-Chloroethyl-chlorobenzene | 142 | 72-78 | 1.2070 | 1.5436 | 0.82 |
| 7 | Unknown | 88 | 78-80.5 | 1.2200 | 1.5471 | 0.31 |
| 8 | Residue | 235 | | 1.3835 | 1.5740 | 0.26 |

The fractions of distillate and the residue contained less free hydrogen chloride than had initially been present in the crude alpha-chloroethylchlorobenzene. It is evident, therefore, that the anion exchange agent combined with a considerable part of the free hydrogen chloride initially present and also with any formed in the distillation and that it prevented accumulation of an appreciable concentration of hydrogen chloride in the distillation mixture.

*Example 2*

Impure alpha-chloroethylbenzene, which contained ethylbenzene, was in separate experiments fractionally distilled at from 3 to 5 mm. absolute pressure in the presence and in the absence, respectively, of a basic form of an anion exchange agent. The procedures in carrying out the distillations were similar to those described in Example 1. In the experiment where no anion exchange agent was employed, decomposition with evolution of much hydrogen chloride occurred after the distillation had been under way only a short time, and it was necessary to discontinue the fractionation. The undistilled residue contained a considerable amount of polymeric material. In the experiment wherein the material subjected to distillation, and also the reflux thereof, were contacted with a basic form of an anion exchange agent, little, if any, decomposition occurred. This distillation was continued to completion without difficulty and purified alpha-chloroethylbenzene was recovered in good yield. No evolution of hydrogen chloride was observed.

*Example 3*

A sample of alpha-chloroethylchlorobenzene which had been purified by fractional distillation in the presence of an anion exchange agent was treated with a small amount (about 0.25 per cent by weight) of a basic form of an anion exchange agent and the mixture was stored in a glass bottle at room temperature for about one month. The anion exchange agent was then removed by filtration. The alpha-chloroethylchlorobenzene remained of good purity and had apparently undergone no change during storage. Another sample of the purified alpha-chloroethylchlorobenzene was stored in the absence of an anion exchange agent but under otherwise similar conditions. After one month of storage it was strongly acidic and obviously had undergone considerable decomposition.

Other modes of applying the principle of the invention may be employed instead of those explained, change being made as regards the method herein disclosed, provided the step or steps stated in any of the following claims or the equivalent of such stated step or steps be employed.

We therefore particularly point out and distinctly claim as our invention:

1. The method which comprises stabilizing a compound having the general formula:

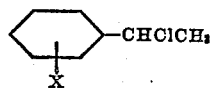

wherein X represents a member of the group consisting of hydrogen and chlorine, against decomposition at temperatures below 180° C. by contacting a basic form of an anion exchange agent therewith.

2. The method which comprises admixing a basic form of an anion exchange agent with a compound having the general formula:

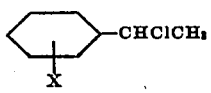

wherein X represents a member of the group consisting of hydrogen and chlorine, whereby said compound, in admixture with the anion exchange agent, is stabilized against decomposition at temperatures below 180° C.

3. A mixture of a compound having the general formula:

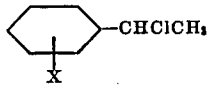

wherein X represents a member of the group consisting of hydrogen and chlorine, and a basic form of an anion exchange agent, which mixture is more stable against decomposition at temperatures below 180° C. than is said compound alone.

4. In a method wherein a compound having the general formula:

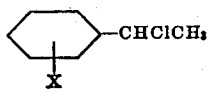

in which formula X represents a member of the group consisting of hydrogen and chlorine, is distilled at sub-atmospheric pressure and at a distilling temperature below 180° C., the step of stabilizing the compound against decomposition during the distillation by contacting a basic form of an anion exchange agent with the material undergoing distillation.

5. In a method of purifying by fractional distillation an impure compound having the general formula:

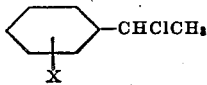

wherein X represents a member of the group consisting of hydrogen and chlorine, the steps of admixing a basic form of an anion exchange agent with said impure compound and heating the mixture under reflux and at sub-atmospheric pressure to a distilling temperature below 180° C. while contacting a basic form of an anion exchange agent with the reflux.

6. The method which comprises stabilizing alpha-chloroethylbenzene against decomposition at temperatures below 180° C. by admixing a basic form of an anion exchange agent therewith.

7. The method which comprises stabilizing alpha-chloroethylbenzene against thermal decomposition when heated at temperatures below 180° C. which comprises contacting a basic form of an anion exchange agent with the heated alpha-chloroethylchlorobenzene.

8. A mixture of alpha-chloroethylbenzene and a basic form of an anion exchange agent, which mixture is more stable against decomposition at temperatures below 180° C. than is the alpha-chloroethylbenzene alone.

9. In a method wherein alpha-chloroethylbenzene is distilled at sub-atmospheric pressure and at a distilling temperature below 180° C., the step of stabilizing the same against decomposition during the distillation by contacting a basic form of an anion exchange agent with the material undergoing distillation.

10. In a method of purifying by fractional distillation an impure form of alpha-chloroethylbenzene, the steps of admixing a basic form of an anion exchange agent with the impure alpha-chloroethylbenzene and heating the mixture under reflux and at sub-atmospheric pressure to a distilling temperature below 180° C. while contacting the reflux with a basic form of an anion exchange agent.

11. The method which comprises admixing a basic form of an anion exchange agent with alpha-chloroethylchlorobenzene, whereby the latter, while in admixture with the anion exchange agent, is rendered more stable against decomposition at temperatures below 180° C. than is the alpha-chloroethylchlorobenzene alone.

12. The method which comprises stabilizing alpha-chloroethylchlorobenzene against decomposition at temperatures below 180° C. by admixing a basic form of an anion exchange agent therewith.

13. A mixture of alpha-chloroethylchlorobenzene and a basic form of an anion exchange agent, which mixture is more stable against decomposition at temperatures below 180° C. than is the alpha-chloroethylchlorobenzene alone.

14. In a method wherein alpha-chloroethylchlorobenzene is distilled at sub-atmospheric pressure and at a distilling temperature below 180° C., the step of stabilizing the same against decomposition during the distillation by contacting a basic form of an anion exchange agent with the material undergoing distillation.

15. In a method of purifying by fractional distillation an impure form of alpha-chloroethylchlorobenzene, the steps of admixing a basic form of an anion exchange agent with the impure alpha-chloroethylchlorobenzene, and heating the mixture under reflux and at sub-atmospheric pressure to a distilling temperature below 180° C. while contacting the reflux with a basic form of an anion exchange agent.

HERBERT G. HORNBACHER.
WILLIAM C. BAUMAN.

REFERENCES CITED

The following references are of record in the file of this patent:

UNITED STATES PATENTS

| Number | Name | Date |
| --- | --- | --- |
| 2,190,776 | Ellingboe et al. | Feb. 20, 1940 |